(12) United States Patent
Huddleston

(10) Patent No.: US 7,627,979 B2
(45) Date of Patent: Dec. 8, 2009

(54) FISH LURE WITH VORTEX TAIL

(75) Inventor: Samuel M. Huddleston, Mesquite, NV (US)

(73) Assignee: Huddleston Deluxe, Inc., Mesquite, NV (US)

( * ) Notice: Subject to any disclaimer, the term of this patent is extended or adjusted under 35 U.S.C. 154(b) by 0 days.

(21) Appl. No.: 11/296,135

(22) Filed: Dec. 7, 2005

(65) Prior Publication Data

US 2006/0117642 A1 Jun. 8, 2006

Related U.S. Application Data

(60) Provisional application No. 60/634,086, filed on Dec. 8, 2004.

(51) Int. Cl.
*A01K 85/00* (2006.01)

(52) U.S. Cl. .................. 43/42.24; 43/42.22; 43/42.39

(58) Field of Classification Search ............... 43/42.39, 43/42.22, 42.24, 42.36; D22/132
See application file for complete search history.

(56) References Cited

U.S. PATENT DOCUMENTS

| | | | |
|---|---|---|---|
| 1,490,389 A | 4/1924 | Hayes | |
| 1,551,677 A | 9/1925 | Malfet | |
| 1,926,459 A | 9/1933 | Sisco | |
| 2,149,054 A | 2/1939 | Jones | |
| 2,235,600 A | 3/1941 | Ammerman | |
| 2,437,549 A | 3/1948 | Pecher | |
| 2,632,277 A | 3/1953 | Cogswell et al. | |
| 2,643,418 A | 6/1953 | Auldridge | |
| 2,718,668 A | 9/1955 | Burke | |
| 2,776,518 A | 1/1957 | Felmlee | |
| 2,828,572 A | 4/1958 | Sargent | |
| 2,847,791 A | 8/1958 | Simmons | |
| 2,873,549 A | 2/1959 | Bartlett | |

(Continued)

FOREIGN PATENT DOCUMENTS

GB 685135 12/1952

(Continued)

OTHER PUBLICATIONS

Case No. 2:07-cv-00202 DF: Signed Order Granting Motion to Dismiss All Claims.

(Continued)

*Primary Examiner*—Kurt Rowan
(74) *Attorney, Agent, or Firm*—Townsend and Townsend and Crew LLP

(57) ABSTRACT

A soft bait fish lure includes an elongated body having a head and a rear along a longitudinal axis. The body tapers laterally to a reduced tail portion toward the rear, then flares laterally into an enlarged tail at the rear. Optionally, the reduced tail portion is flexible in a lateral direction. The enlarged tail may have a tapered top and tapered bottom, each formed from two intersecting faces, such that the enlarged tail forms a substantial diamond-shape in cross-section perpendicular to the longitudinal axis. Optionally, each of the faces includes a contour terminating in an edge proximate said rear such that fluid flowing over said enlarged tail forms a vortex at each said face. Optionally, the rear forms a distal surface including a lateral indentation at the intersection of the tapered top and tapered bottom.

16 Claims, 4 Drawing Sheets

U.S. PATENT DOCUMENTS

| | | | |
|---|---|---|---|
| 3,068,604 | A | 12/1962 | Nyberg |
| 3,199,244 | A | 8/1965 | Frederiksen, Sr. |
| 3,218,750 | A * | 11/1965 | Lewin ................. 43/42.28 |
| 3,879,882 | A | 4/1975 | Rask |
| 3,986,291 | A | 10/1976 | Hopper |
| 4,317,305 | A | 3/1982 | Firmin |
| 4,887,377 | A | 12/1989 | Morris |
| 5,142,811 | A * | 9/1992 | Freeman ................. 43/42.53 |
| 5,193,299 | A * | 3/1993 | Correll et al. ............ 43/42.47 |
| 5,815,978 | A | 10/1998 | Huddleston |
| 6,141,900 | A * | 11/2000 | Rudolph ................. 43/42.24 |
| 6,182,391 | B1 | 2/2001 | Hubbard |
| 6,266,916 | B1 * | 7/2001 | Dugan ................. 43/42.37 |
| 6,393,757 | B2 * | 5/2002 | Bomann ................. 43/42.09 |
| 6,857,220 | B2 * | 2/2005 | King ................. 43/42.28 |
| 7,080,476 | B2 | 7/2006 | King |
| 2005/0126065 | A1 | 6/2005 | Ishii |
| 2006/0117642 | A1 | 6/2006 | Huddleston |

FOREIGN PATENT DOCUMENTS

| | | |
|---|---|---|
| JP | H05-023865 | 3/1993 |
| JP | H07-030668 | 6/1995 |
| JP | H09-191795 | 7/1997 |
| JP | H09-313071 | 12/1997 |
| JP | H10-136835 | 5/1998 |
| JP | H11-243813 | 9/1999 |
| JP | 2000-157105 | 6/2000 |
| JP | 2005-065668 | 3/2005 |
| JP | 2005-095067 | 4/2005 |
| WO | WO 99/37144 | 7/1999 |

OTHER PUBLICATIONS

Bass West USA Magazine: The First and Final Word on Bass Fishing. Apr./May 2008 edition, pp. 20-25; 28-33.
Field & Stream Magazine: The World's Leading Outdoor Magazine. Spring Fishing Issue; Apr. 2008; pp. 78-80.
FLW Outdoors Magazine: Bass Edition. Mar. 2008; pp. 38-40; 42; 44.
FLW Outdoors Magazine: Bass Edition. Oct. 2007; p. 20.
Case No. 2:07-cv-00202 DF: Claim Construction Order.
Case No. 2:07-cv-00202 DF: Certificate of Service of Partial Opposition.
Case No. 2:07-cv-00202 DF: Defendant's Partial Opposition to Motion to Dismiss.
Case No. 2:07-cv-00202 DF: Plaintiffs' Motion to Dismiss All Claims with Prejudice.
Case No. 2:07-cv-00202 DF: Proposed Order Dismissing All Claims.
Case No. 2:07-cv-00202 DF: Proposed Order Granting Motion to Dismiss.

* cited by examiner

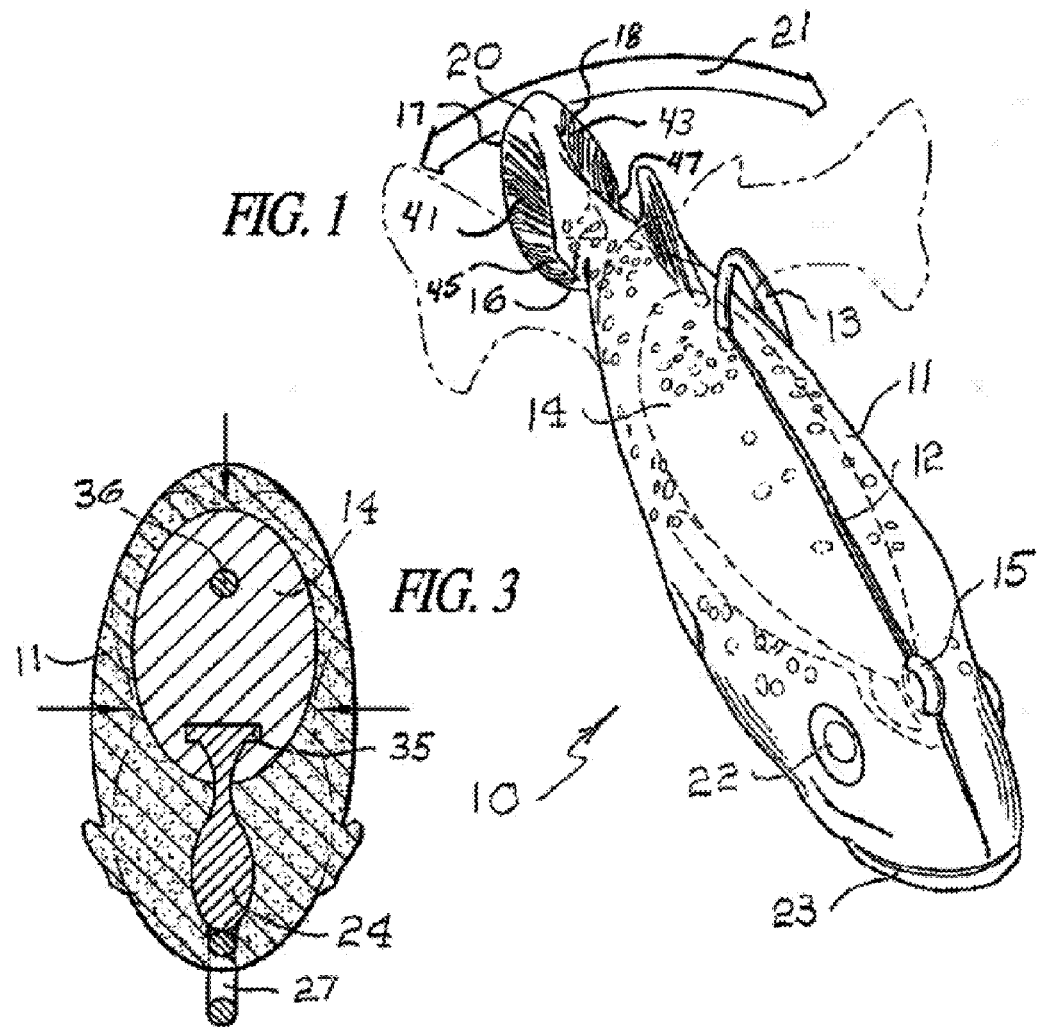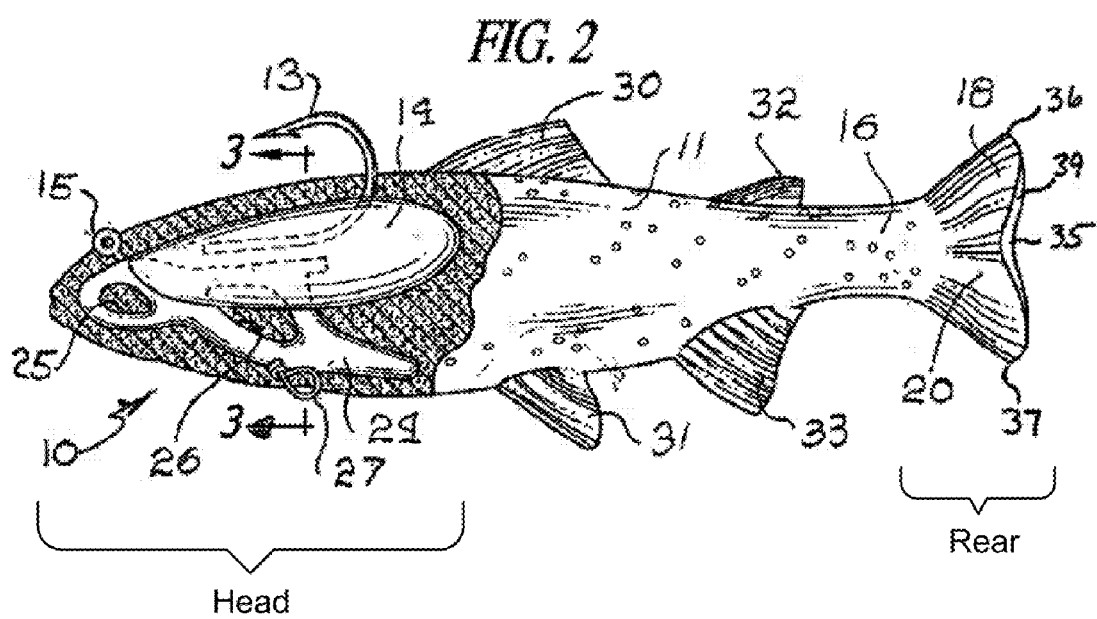

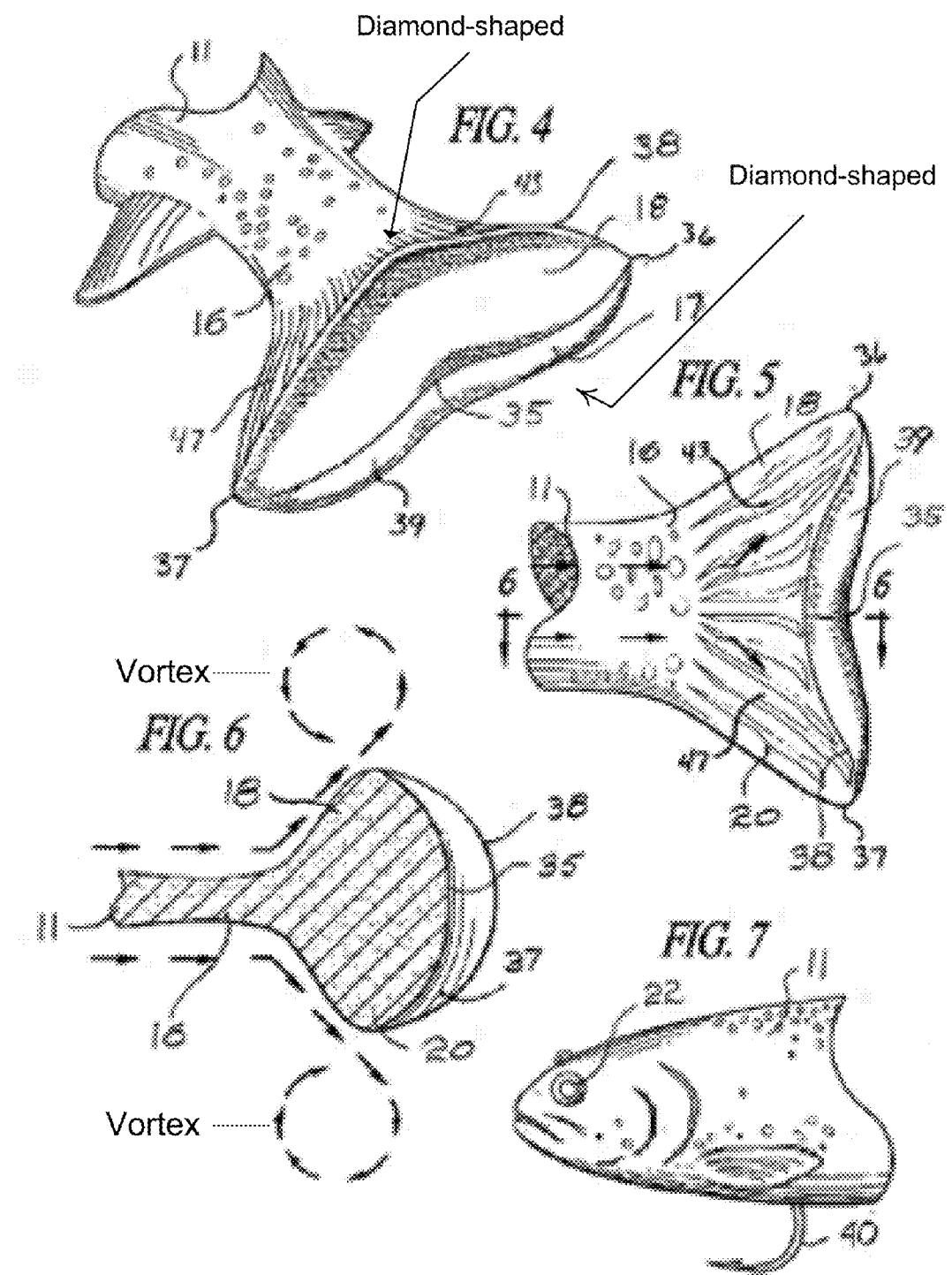

FISH LURE WITH VORTEX TAIL

RELATED APPLICATION DATA

The present application claims the priority of U.S. Provisional Application Ser. No. 60/634,086, entitled "Fish Lure with Vortex Tail," filed Dec. 8, 2004 by Applicant herein.

FIELD OF THE INVENTION

The present invention relates to the field of fishing lures, and more particularly to a novel swim bait fishing lure having improved performance with respect to depth and speed of the lure at which swim bait can be fished.

BACKGROUND OF THE INVENTION

Realistic fishing lures, devices which look and act like live, swimming, animals, are increasing in popularity among game fisherman. Known as swim bait, these devices emulate the look and the motion of smaller swimming fish and other creatures, attracting larger game fish to the hook and capture.

Conventionally, three main factors are involved in determining the depth and speed at which swim bait can be fished, i.e. where they can be effectively used. The first factor is the rate of fall or sinking speed of the bait, while the second factor is slack time, meaning the time between casting and the commencement of retrieval, and thirdly, the speed of retrieval. Normally, a slow sinking swim bait, given enough line and time, may be fished in a slow manner in the deepest part of any given body of water. A faster sinking swim bait allows the fisherman to reach the same depth sooner and the ability to fish that depth at a faster speed. Both of these baits could also be fished in five feet of water, again the faster sinking would be fished at a faster retrieve.

After acquiring practice in using these baits, the fisherman is able to target depth and speed with pinpoint accuracy that will maintain the lure in a fish strike zone, i.e. the area in which the target fish is likely to strike, longer.

Therefore, a long-standing need has existed to provide a swim bait which, when selected and used by an accomplished fisherman, provides a known, predetermined, rate of fall. Such fishermen understand that a slower retrieve equates to a deeper route, while a faster retrieve yields a shallower route. As such, one who is so skilled can cause the swim bait to follow a path at the desired depth by combining the rate of fall with the rate of retrieve. The rate of fall is not an exact science but provides a baseline from which to start, usually based upon the rate of fall value indicated for the specific swim bait to be employed.

Thus, there is a need for a swim bait lure, potentially composed of soft plastic material, which can be fished at a variety of speeds, ranging from a relatively fast speed to a very slow speed, thereby allowing its usage at virtually any desired depth, given enough time to descend. When retrieved through the water, the preferred swim bait lure includes a means for causing a side-to-side tail movement, making the swim bait lure appear to be swimming. To effectively control the rate of fall, a net buoyancy should be enabled, independent of any supplementary weighting media used, giving a choice of rates of fall, and hence the ability for the swim bait lure to be fished at different depths. A plurality of such swim bait fishing lures may meet this buoyancy requirement, where the lures vary in weight, thereby resulting in a set of lures which will operate at a variety of depths.

SUMMARY OF THE INVENTION

Accordingly, the above problems and difficulties are avoided by the present invention which provides a unique swim bait lure having a soft flexible fish body including a full profile scooped vortex tail which will provide a simulated swimming action when drawn through the water. A distinct narrowing along the center line along each side of the tail provides an even drag, keeping the tail in a stable side-to-side movement creating a right and left vortex in its wake. A desired level of buoyancy is selected by use of a weighted insert which thereby determines the rate of fall and resulting depth of the route followed. The rate of fall system is based on a ten-second count. The soft tail of the lure includes a reduction in thickness immediately before an expanded tail fin body, so that the stream of on-coming water passing over the area of thickness reduction causes right and left vortices to be created which, in turn, causes the tail fin body to flex or undulate simulating a swimming action for the swim bait. The swimming action is simulated by the swim bait lure being largely constructed in the shape of a fish and being composed of a soft and flexible material which completely encloses the buoyancy-negating weighted insert, as well as providing an anchor point for a suitable hook.

Therefore, it is among the primary objects of the present invention to provide a novel fish lure which includes a full profile scooped vortex tail which will demonstrate a swimming action and act as a lure to attract target fish.

Another object of the present invention is to provide a fishing lure having a scooped vortex tail whereby a reduced thickness along the center line along each side of the tail provides an even drag, thereby maintaining a stable side-to-side tail movement whereby creating a left and right vortex in the wake of the "swimming" fish.

Yet another object of the present invention is to provide a fishing lure that can be fished at a wide range of retrieval speeds, allowing a range of depths to which the lure will descend, and thereby generating a range of route depths along which retrieval will be accomplished.

A further object of the present invention is to provide a fishing lure which employs a varying level of buoyancy to produce a determinable rate of fall of the bait, which has a means of determining slack time, which is the time between cast and start of retrieval, and which has a means to control the speed of retrieval.

Another object of the present invention is the effectuation of a means of attaching a fishing line to the head portion of a lure such that the lure may slide along the fishing line.

Another object resides in providing a means of fishing lure construction to use the weight of the lure in such a way as to compensate for the efforts of a fighting fish to throw off the hook.

BRIEF DESCRIPTION OF THE DRAWINGS

FIG. 1 is a front perspective view of an optional embodiment of the present invention;

FIG. 2 is a side elevational view of the embodiment shown in FIG. 1, having the frontal portion in sectional view, exposing the buoyancy control means;

FIG. 3 is a transverse cross-sectional view of the embodiment shown in FIG. 2 taken along section line 3-3;

FIG. 4 is a diagonal rear perspective view of the tail portion of the embodiment shown in FIGS. 1-3 inclusive;

FIG. 5 is a side view of the tail portion of the embodiment shown in FIG. 4 illustrating water current as the tail is drawn or pulled through the water;

FIG. 6 is a fragmentary sectional view of the embodiment shown in FIG. 5 taken along section line 6-6, illustrating the creation of right and left vortices, of clockwise and counter-clockwise rotation as is shown by arrows, causing the tail to flex, simulating a swimming motion;

FIG. 7 is a side view of the head portion of the invention illustrating attachment of a hook;

DESCRIPTION

Figure 9:
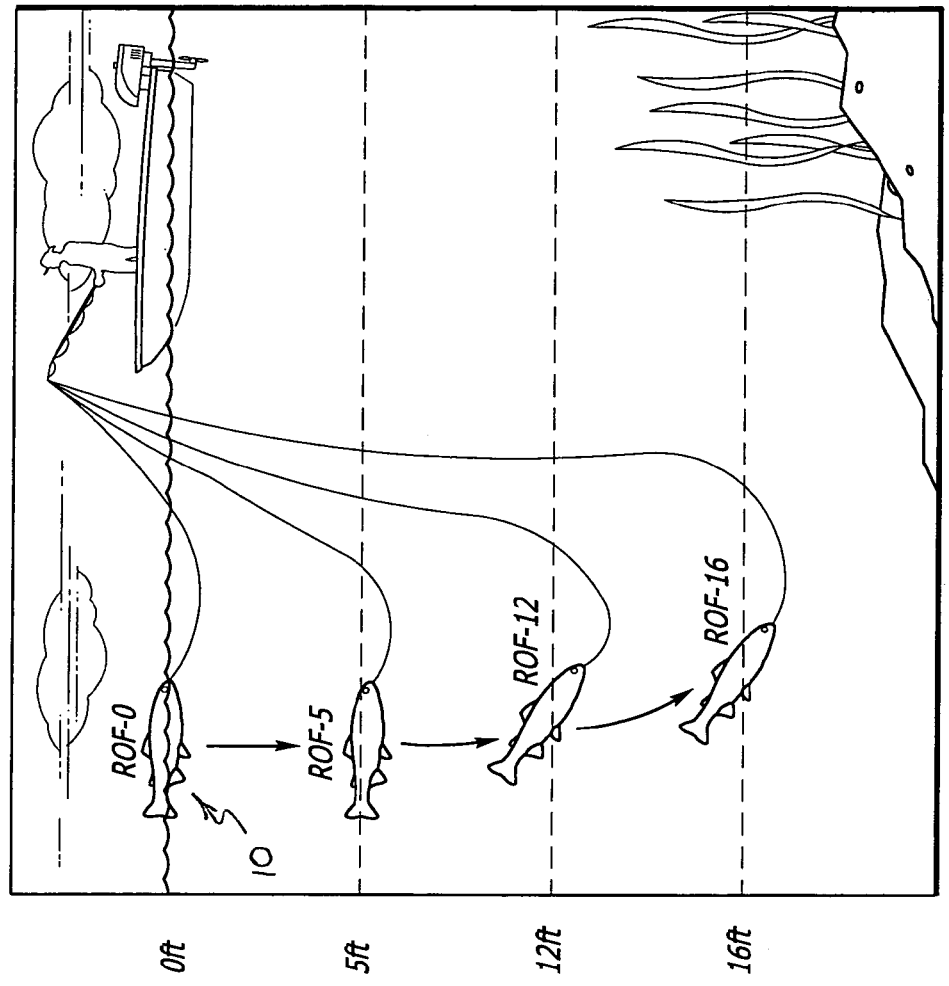
FIG. 9 is a diagrammatic illustration of the rate of fall system employing the effect of variable buoyancy as incorporated into the invention.

Referring generally to FIGS. 1 and 2, the optional embodiment illustrated reveals an elongated body 11 composed of a soft and flexible material designed to simulate the body of a fish in appearance and in motion. Optionally, the body 11 may be constructed in halves and joined together by a seam line 12. Alternately, the body 11 may be constructed of a single piece. Optionally, a hook 13 is embedded into the body 11 and anchored to a weighted insert 14 as illustrated in the figures. In such an optional embodiment, a loop 15 may be provided for attachment to the end of a fishing line or lead; optionally, the loop 15 is also attached to the weight insert 14.

The body 11 of the lure or bait tapers laterally and rearwardly into a reduced tail portion 16 which then flares laterally into an enlarged tail 20 at a rear of the body. Optionally, the enlarged tail is constructed from symmetrical lobes 17 and 18. Thereby, the tail 20 is free to flex or swing to either side of the body 11 in a motion indicated by the double arrow 21. The position of the tail 20 during such motion is indicated in broken lines, and emulates a swimming motion designed to attract the target fish.

A head of the fish body 11 may include a molded replica of such anatomical details as a pair of eyes 22 and a mouth 23 so as to more convincingly simulate the appearance of a fish.

Referring specifically to FIG. 2, the float and swim characteristics can optionally be controlled using a weighted insert 14. In the optional embodiment illustrated, it can be seen that the weighted insert 14 includes a body mass with an attachment 24 depending downwardly therefrom. In this optional embodiment, the attachment 24 is firmly secured to the body mass of the weighted insert 14 and includes a pair of openings 25, 26 through which material of the body 11 passes to insure securement and immobility of the weighted insert 14. Also, the shape of the attachment 24 is such that a portion resides in the head of the fish lure body 11 while another portion extends rearwardly, approaching the mid-section of the body 11. A loop 27 downwardly depends from the attachment 24 and may be used for the fastening of a hook in the event that an integrated hook 13 is not employed. As discussed in greater detail below, in an optional embodiment the portion proximate the head of the body may be less dense than the potion proximate the mid-section. For example, the weighted insert 14 could include a portion proximate the head formed from a polymer foam, and a portion proximate the mid-section formed from a metal. Controlling the relative densities, as well as the shape and location of the weighted insert 14 and attachment 24 aid in designing the buoyancy and motion characteristics of the lure or bait.

FIG. 2 further illustrates that the body 11 may include a dorsal fin 30 and a belly fin 31, as well as stabilizing fins 32, 33. Such fins 30-33 may serve as fluid dynamic stabilizers as well as completing the image of a swimming fish.

In FIG. 3, it can be seen that the weighted insert 14 is weighted and is completely surrounded by the soft material of the body 11. In a similar fashion, the attachment 24 is completely surrounded by the material of body 11. The attachment 24 optionally includes an anchor-portion 35 that is completely embedded in the mass of the weighted insert 14. The shank 36 of the hook 13 may optionally be embedded into the mass of the weighted insert 14 also. As discussed above, the relative densities of the weighted insert 14, the attachment 24, and the hook 13 may be designed such that the body 11 of the lure is maintained in a top-up orientation when pulled through the water. Likewise, the position of the weighted insert 14, the attachment 24, and the hook 13, being in the forward part of the body 11 of the lure, maintains the lure 11 in a nose-down attitude, further reinforcing the swimming imagery.

Referring now in detail to FIGS. 1 and 4-6, the tail 16 of the fish lure is illustrated. As shown in FIG. 1, the tail 16 optionally includes a tapered top 36 formed from a pair of intersecting faces 41, 43 and a tapered bottom 37 formed from a pair of intersecting faces 45, 47. In the optional embodiment illustrated in FIGS. 4-6, the faces 41, 43, 45, 47 may be contoured to terminate in an edge 38 at the distal surface 39 of the tail 16. In the optional embodiment illustrated, the distal surface 39 of the tail may include a lateral indentation 35. Thus, in the optional embodiment of FIG. 4, the rear surface 36, 37 of the two lobes 17, 18, when taken together, provide a wavy, distal surface 39 that is diamond-shaped in cross-section. The bottom of the lateral indentation 35 may be defined as a middle side point between the tapering top 36 and tapering bottom 37 which extend toward the middle side point from the peripheral edge 38 of the tail portion 16.

When retrieved through the water, the tail 16 gently moves from side-to-side, making the lure appear to be swimming. This effect is at least in part achieved by a full profile scooped vortex tail construction. The expanded tail 16 creates left and right vortices in its wake. The vortices are more clearly shown in FIG. 6 by the clockwise and counter-clockwise arrangement of arrows. As the lure is drawn through the water, the water flowing over the tail 16 is diverted to either side. The movement of the tail 16 creates a "scooped" area on either side of the tail 16 and the water diverted is drawn into such "scooped" area at an oblique direction creating the vortex, indicated by the circle of arrows on either side of the tail portion 16. As noted above, any expanded tail 16 shape could function in this way, but in the optional embodiment shown, an expanded tail 16 with a substantially diamond-shaped cross-section with respect to the longitudinal axis is illustrated.

Figure 8:
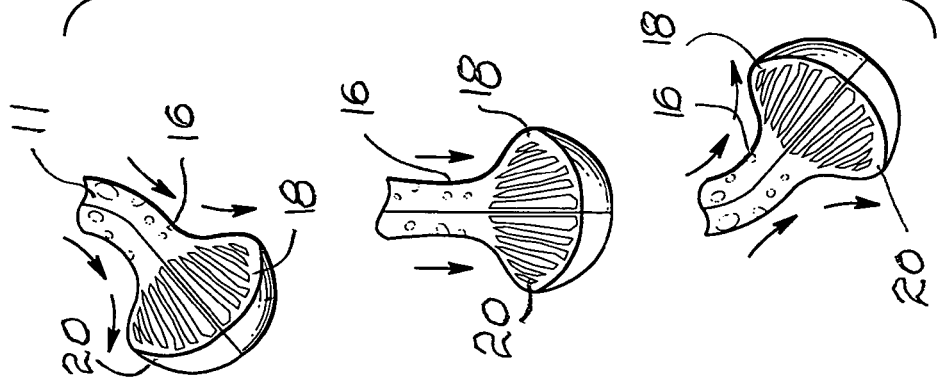
FIG. 8 is an illustration of the tail portion of the invention as shown in FIG. 6, as it undergoes side-to-side motion, illustrating a wiggling swimming movement.

To further illustrate the side-to-side movement of the tail portion 16, reference is made to FIG. 8, wherein the top view illustrates the tail portion 16 swung in one direction, the left, while canting back towards the middle, the middle view illustrates the tail portion 16 at its neutral or central position, and the bottom view illustrates the tail portion 16 swung in the opposite, or right, direction and canting back towards the middle. The water flow as shown by the arrows strikes the laterally tapered tail portion 16, causing the tail to flex accordingly, giving the impression of swimming. At the same time, the diversion of the water flow by the tail portion 16 creates the vortices as described above.

FIG. 7 shows that a depending hook 40 may have its shank embedded into the weighted insert 14 so that the barb thereof downwardly depends from the underside of the fish head. This is an alternate embodiment to that shown in FIG. 2, where the hook 13 projects upward from the body 11 of the lure.

Referring now to FIG. 9, a chart is provided showing that the weighted insert 14 of the fish lure provides the lure with the ability to be fished at different depths. The chart illustrates four different rates of fall ("ROF"), spaced on a ROF system and assuming a ten second delay between cast and retrieval, i.e. ten seconds for the fish lure to descend. Changing the weight and balance of the weighted insert 14 will dictate the lure's depth and pitch. Such is illustrated for zero feet ROF-0 or on the surface of the water showing a floating lure with just the back showing. A five foot depth ROF-5 illustrates the fish lure descending in parallel to the bottom. At twelve foot depth ROF-12 and at sixteen foot depth ROF-16, the fish bait descends to the appropriate depth in ten seconds, ready to respond to retrieval speed.

The ten second countdown is considered slack time. As an example, if the ROF is twelve feet ROF-12, this means that after casting the lure and engagement of the reel, a countdown of ten seconds is applied before starting retrieval of the lure by which time the lure will have descended to a depth of twelve feet. The lure will not remain at exactly twelve feet but remember that a slower retrieval equals deeper, and faster equals shallower. The ROF is not an exact procedure, but it will give the fisherman a baseline to start the fishing procedure. In the optional embodiment illustrated, an ROF number will be indicated on each swim bait for the convenience of the fisherman.

Figure 10:
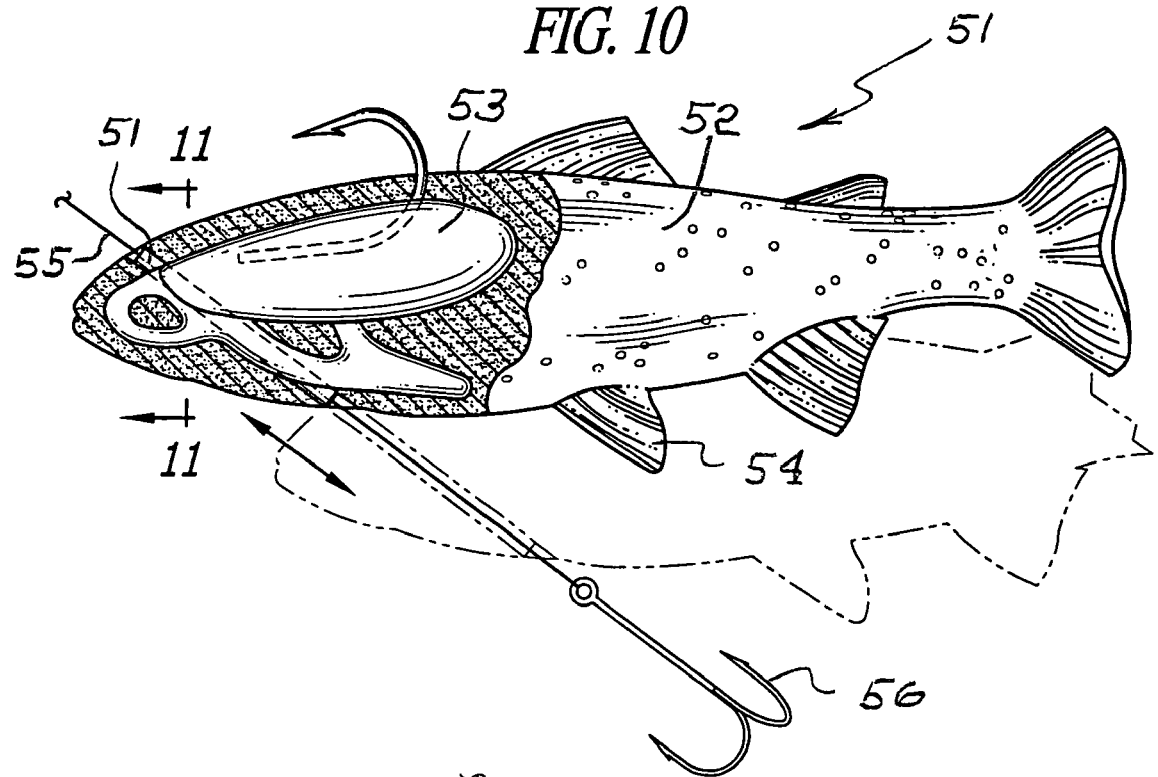
FIG. 10 is a side view of an alternative embodiment of the invention having a tube through which a fishing line passes.
Figure 11:
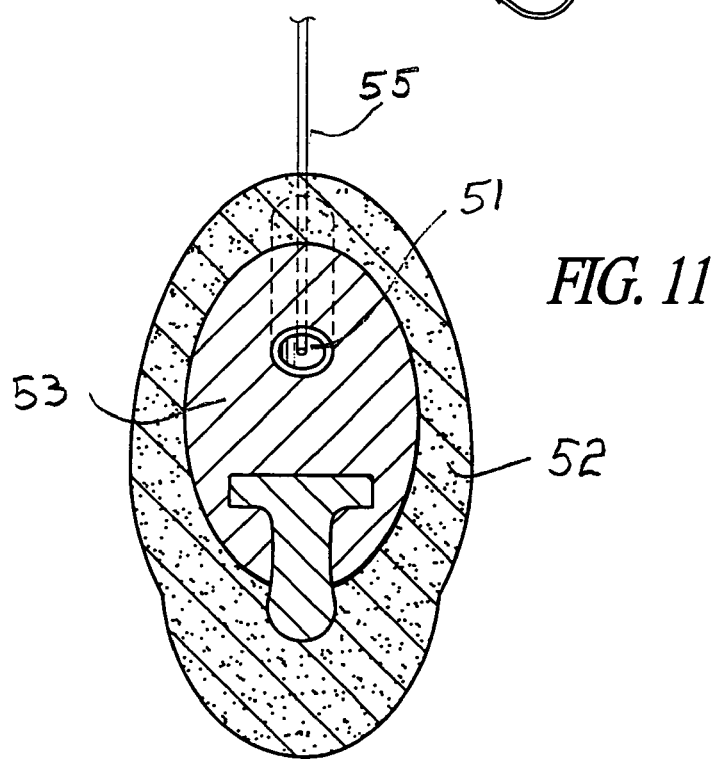
FIG. 11 is a transverse cross-sectional view of the fishing lure shown in FIG. 10 as taken along section line 11-11.

Referring to FIGS. 10 and 11, in an alternate optional embodiment of the invention is illustrated wherein an open-ended hollow tube 51 is installed in the head portion of the fish body 52 at an angle to a central longitudinal axis of the body. The tube 51 is mounted through a weight 53 with a top open end opening at the top head portion, while a bottom open end terminates at the bottom of the body ahead of a fin 54. The fish body 11 slides along a fishing line 55 such as shown between broken lines and solid lines. There is no restriction on the sliding capability of the fish lure body 11.

In the optional embodiment illustrated in FIG. 10, a hook 56 is tied to the end of the fishing line 55. In an alternate optional embodiment, the hook 56 may be held against the belly of the fish lure body 11 by a clip or the like. The hook 56 would then reside between the left and right belly fins 54 of the lure.

The tube 51 is used in place of a fixed wire with the hook directly attached to the main fishing line 55. The lure is allowed to slide-up the 55 line away from the hook 56 and fish. This action removes the ability for a fighting fish to use the weight of the lure to throw the hook 56.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A soft bait fish lure comprising an elongated body having a head and a rear along a longitudinal axis, said body tapering laterally to a reduced tail portion toward said rear, wherein said reduced tail portion is flexible in said lateral direction, said reduced tail portion flaring laterally into an enlarged tail at said rear, said enlarged tail having a tapered top and tapered bottom to form a substantial diamond-shape in cross section perpendicular to said longitudinal axis, a lateral indentation configured on a distal surface at the intersection from the tapered top and the tapered bottom, a weighted insert embedded within said body;

wherein said tapered top is formed from two intersecting faces, and said tapered bottom is formed from two intersecting faces, and said rear forms a distal surface intersecting the tapered top and tapered bottom, each of said faces includes a contour terminating in an edge proximate said rear such that fluid flowing over said enlarged tail forms a vortex at each said face;

wherein said weighted insert includes a first portion and a second portion, said first portion less dense than said second portion, said weighted insert embedded within said body with said first portion disposed proximate a top of said body and said second portion proximate a bottom of said body, the weighted insert being provided in a portion of the head; and wherein said first portion is formed from a polymer foam and said second portion is formed from a metal.

2. The lure of claim 1 wherein said distal surface includes the lateral indentation at the intersection of said tapered top and said tapered bottom and said body is bilaterally symmetrical about said axis.

3. The lure of claim 1 wherein said body is bilaterally symmetrical about said longitudinal axis.

4. The lure of claim 1 wherein said body is formed from a soft flexible polymer.

5. The lure of claim 1 wherein said weighted insert attaches a hook extending from said body.

6. The lure of claim 1 wherein said weighted insert attaches to a loop extending from said body.

7. The lure of claim 1 wherein said weighted insert includes a hollow tube, such that when said weighted insert is embedded in said body, said hollow tube provides a passage through said body.

8. A soft fish bait fish lure comprising an elongated body having a head and a rear along a longitudinal axis, said body tapering laterally to a reduced tail portion toward said rear, wherein said reduced tail portion is flexible in said lateral direction, said reduced tail portion flaring laterally into an enlarged tail at said rear, said enlarged tail having a tapered top and tapered bottom to form a substantial diamond-shape in cross-section perpendicular to said longitudinal axis, wherein said tapered top is formed from two intersecting faces, said tapered bottom is formed from two intersecting faces, wherein each of said faces includes a contour terminating in an edge proximate said rear such that fluid flowing over said enlarged tail forms a vortex at each said face, and wherein said rear forms a distal surface including a lateral indentation at the intersection of the tapered top and tapered bottom;

a weighted insert embedded within said body;

wherein said body has a top and a bottom and wherein said weighted insert includes a first portion and a second portion, said first portion less dense than said second portion, said weighted insert embedded within said body with said first portion disposed proximate a top of said body and said second portion proximate a bottom of said body, said weighted insert being disposed proximate the head; and wherein said first portion is formed from a polymer foam and said second portion is formed from a metal.

9. The lure of claim 8 wherein said body is bilaterally symmetrical about said longitudinal axis.

10. The lure of claim 8 wherein said body is formed from a soft flexible polymer.

11. The lure of claim 8 wherein said weighted insert attaches to a hook extending from said body.

12. The lure of claim 8 wherein said weighted insert attaches to a loop extending from said body.

13. The lure of claim 8 wherein said weighted insert includes a hollow tube, such that when said weighted insert is embedded in said body, said hollow tube provides a passage through said body.

14. The lure of claim 8 wherein said weighted insert further comprises an attachment depending downwardly from said body, the attachment comprises a first opening and a second opening, a material of said body passes through the first opening and the second opening.

15. A swim bait fishing lure comprising:
   an elongated bodying having a head and a rear along a longitudinal axis;
   a reduced tail portion from the body tapering laterally to the reduced tail portion toward the rear, the reduced tail portion being flexible in the lateral direction;
   a weighted insert comprising a first portion proximate the head of the elongated body and a second portion, the first portion configured to be less dense than the second portion, the weighted insert embedded within the elongated body;
   an enlarged tail flaring from the reduced tail portion, the enlarged tail having a tapered top and a tapered bottom, the tapered top being formed from two intersecting faces, the tapered bottom being formed from two intersecting faces, the rear forms a distal surface intersecting the tapered top and the tapered bottom;
   a contour extending from the reduced tail portion on each of the faces terminating in an edge proximate the rear to cause a vortex within a vicinity of each of the faces from a flowing fluid and to provide an even drag, keeping the enlarged tail in a stable side to side movement creating a right and left vortex; and
   a lateral indentation configured on the distal surface at the intersection from the tapered top and the tapered bottom;
   wherein the first portion is made of a polymer foam and the second portion is made of a metal.

16. The lure of claim 15 wherein the weighted insert configured to maintain the lure in a top-up orientation when pulled through the water.

\* \* \* \* \*